US012638830B2

(12) United States Patent
Seyama

(10) Patent No.: US 12,638,830 B2
(45) Date of Patent: May 26, 2026

(54) POSITION CONTROL APPARATUS, POSITION CONTROL METHOD, POSITION CONTROL RECORDING MEDIUM, AND BONDING APPARATUS

(71) Applicant: Yamaha Robotics Co., Ltd., Tokyo (JP)

(72) Inventor: Kohei Seyama, Tokyo (JP)

(73) Assignee: Yamaha Robotics Co., Ltd., Tokyo (JP)

( * ) Notice: Subject to any disclaimer, the term of this patent is extended or adjusted under 35 U.S.C. 154(b) by 546 days.

(21) Appl. No.: 18/014,728

(22) PCT Filed: Jan. 18, 2021

(86) PCT No.: PCT/JP2021/001395
§ 371 (c)(1),
(2) Date: Jan. 5, 2023

(87) PCT Pub. No.: WO2022/153518
PCT Pub. Date: Jul. 21, 2022

(65) Prior Publication Data
US 2023/0273599 A1     Aug. 31, 2023

(51) Int. Cl.
*G05B 19/418*     (2006.01)

(52) U.S. Cl.
CPC .................. *G05B 19/41815* (2013.01); *G05B 19/41805* (2013.01); *G05B 19/41875* (2013.01)

(58) Field of Classification Search
CPC ........... G05B 19/41815; G05B 19/402; H01L 21/681; H01L 2224/75702; H01L 2224/75753; H01L 2224/75841
See application file for complete search history.

(56) References Cited

U.S. PATENT DOCUMENTS 7,239,399 B2 * 7/2007 Duquette ............. H04N 13/207
348/E13.005
2014/0081441 A1 * 3/2014 Regan ................ G05B 19/4097
700/98

(Continued)

FOREIGN PATENT DOCUMENTS

JP          H05180622          7/1993
JP          H05180622 A   *   7/1993

(Continued)

OTHER PUBLICATIONS

"International Search Report (Form PCT/ISA/210) of PCT/JP2021/ 001395," mailed on Apr. 20, 2021, with English translation thereof, pp. 1-4.

(Continued)

*Primary Examiner* — Mong-Shune Chung
(74) *Attorney, Agent, or Firm* — JCIPRNET

(57)          ABSTRACT

A position control apparatus includes: a tool unit performing a work on a target object placed on a stage; a first imaging unit imaging a reference indicator set on the stage or the target object and outputting a first image; a second imaging unit imaging the reference indicator and outputting a second image; a head unit supporting the tool unit, the first imaging unit, and the second imaging unit; a calculation unit calculating three-dimensional coordinates of the reference indicator based on a first indicator image which is an image of the reference indicator captured in the first image, and a second indicator image which is an image of the reference indicator captured in the second image; and a drive control unit causing the tool unit to approach or separate from the target object based on the three-dimensional coordinates.

20 Claims, 7 Drawing Sheets

(56)             References Cited

U.S. PATENT DOCUMENTS

| | | | | |
|---|---|---|---|---|
| 2017/0154864 | A1* | 6/2017 | Hayata | H01L 21/67138 |
| 2022/0181181 | A1* | 6/2022 | Shin | H01L 24/75 |
| 2022/0216077 | A1* | 7/2022 | Nagatomo | H01L 21/681 |
| 2022/0223450 | A1* | 7/2022 | Seyama | H01L 21/67144 |
| 2022/0414843 | A1* | 12/2022 | Takatsu | G06T 7/73 |
| 2023/0196614 | A1* | 6/2023 | Sekiguchi | G06T 1/0014 |
| | | | | 700/109 |
| 2023/0326870 | A1* | 10/2023 | Hamada | G01N 21/956 |
| | | | | 257/797 |
| 2023/0341558 | A1* | 10/2023 | Kato | G01S 17/89 |

FOREIGN PATENT DOCUMENTS

| | | | | | |
|---|---|---|---|---|---|
| JP | 2014036068 | | 2/2014 | | |
| JP | 2014103353 | A * | 6/2014 | ....... | G01N 21/95684 |
| JP | 2016025304 | | 2/2016 | | |
| JP | 2016025304 | A * | 2/2016 | | |
| JP | 2019153701 | A * | 9/2019 | | |
| JP | 2020061492 | | 4/2020 | | |
| JP | 2020061492 | A * | 4/2020 | | |
| JP | 7018341 | B2 * | 2/2022 | ............ | H01L 21/52 |
| KR | 20050044446 | | 5/2005 | | |

OTHER PUBLICATIONS

"Office Action of Korea Counterpart Application", issued on Oct. 15, 2024, with English translation thereof, p. 1-p. 14.
"Office Action of Korea Counterpart Application", with English translation thereof, issued on Mar. 6, 2025, pp. 1-5.

* cited by examiner

POSITION CONTROL APPARATUS, POSITION CONTROL METHOD, POSITION CONTROL RECORDING MEDIUM, AND BONDING APPARATUS

CROSS-REFERENCE TO RELATED APPLICATION

This application is a 371 application of the International PCT application serial no. PCT/JP2021/001395, filed on Jan. 18, 2021. The entirety of the above-mentioned patent application is hereby incorporated by reference herein and made a part of this specification.

TECHNICAL FIELD

The present invention relates to a position control apparatus, a position control method, a position control recording medium, and a bonding apparatus.

RELATED ART

For example, in an apparatus such as a die bonder that is used in the manufacture of semiconductor chips, first, a work target object such as a die pad is imaged from directly above with a camera to confirm its position. Then, after retracting the camera, a head unit supporting a tool unit such as a bonding tool is moved directly above the work target to perform work such as bonding (see, for example, Patent Literature 1).

CITATION LIST

Patent Literature

[Patent Literature 1] JP 2014-036068 A

SUMMARY OF INVENTION

Technical Problem

In a case where position confirmation and work are executed sequentially, not only does it take time, but also a measured position may deviate due to the influence of heat or the like between the position confirmation and the work. In addition, when an imaging unit is installed on a structure separate from a head unit, factors causing measurement errors increase. On the other hand, if a conventional imaging unit is arranged on a tool side of the head unit, it is difficult to observe the work target object due to its narrow field of view.

The present invention has been made to solve such problems, and provides a position control apparatus or the like capable of realizing an accurate three-dimensional coordinate measurement of a target object with respect to the head unit and shortening lead time from the three-dimensional coordinate measurement of the target object to the execution of work.

Solution to Problem

A position control apparatus according to a first aspect of the present invention includes: a tool unit performing a work on a target object placed on a stage; a first imaging unit imaging a reference indicator which is set on the stage or the target object and outputting a first image; a second imaging unit imaging the reference indicator and outputting a second image; a head unit supporting the tool unit, the first imaging unit, and the second imaging unit; a calculation unit calculating three-dimensional coordinates of the reference indicator based on a first indicator image which is an image of the reference indicator captured in the first image, and a second indicator image which is an image of the reference indicator captured in the second image; and a drive control unit causing the tool unit to approach or separate from the target object based on the three-dimensional coordinates.

Further, a position control method according to a second aspect of the present invention includes: an imaging step of causing each of a first imaging unit and a second imaging unit supported by a head unit to image a reference indicator set on a stage or a target object placed on the stage; a calculation step for calculating three-dimensional coordinates of the reference indicator based on a first indicator image which is an image of the reference indicator captured in a first image outputted by the first imaging unit, and a second indicator image which is an image of the reference indicator captured in a second image outputted by the second imaging unit; and a driving step for causing a tool unit supported by the head unit and performing work on the target object to approach or separate from the target object based on the three-dimensional coordinates.

Further, a position control recording medium that stores a program according to a third aspect of the present invention includes: an imaging step of causing each of a first imaging unit and a second imaging unit supported by a head unit to image a reference indicator set on a stage or a target object placed on the stage; a calculation step for calculating three-dimensional coordinates of the reference indicator based on a first indicator image which is an image of the reference indicator captured in a first image outputted by the first imaging unit, and a second indicator image which is an image of the reference indicator captured in a second image outputted by the second imaging unit; and a driving step for causing a tool unit supported by the head unit and performing work on the target object to approach or separate from the target object based on the three-dimensional coordinates.

Further, a bonding apparatus according to a fourth aspect of the present invention includes: a bonding tool bonding a semiconductor chip to a mounting region of a substrate placed on a stage; a first imaging unit imaging a reference indicator which is set on the stage or the substrate and outputting a first image; a second imaging unit imaging the reference indicator and outputting a second image; a head unit supporting the bonding tool, the first imaging unit, and the second imaging unit; a calculation unit calculating three-dimensional coordinates of the reference indicator based on a first indicator image which is an image of the reference indicator captured in the first image, and a second indicator image which is an image of the reference indicator captured in the second image; and a drive control unit causing the bonding tool holding the semiconductor chip to approach or separate from the mounting region based on the three-dimensional coordinates.

Effects of Invention

According to the present invention, it is possible to provide a position control apparatus or the like capable of realizing an accurate three-dimensional coordinate measurement of a target object with respect to the head unit and shortening lead time from the three-dimensional coordinate measurement of the target object to the execution of work.

DESCRIPTION OF EMBODIMENTS

Hereinafter, the present invention will be described through embodiments of the present invention, but the present invention according to the scope of claims is not limited to the following embodiments. Moreover, not all the configurations described in the embodiments are essential as means for solving the problems.

Figure 1:
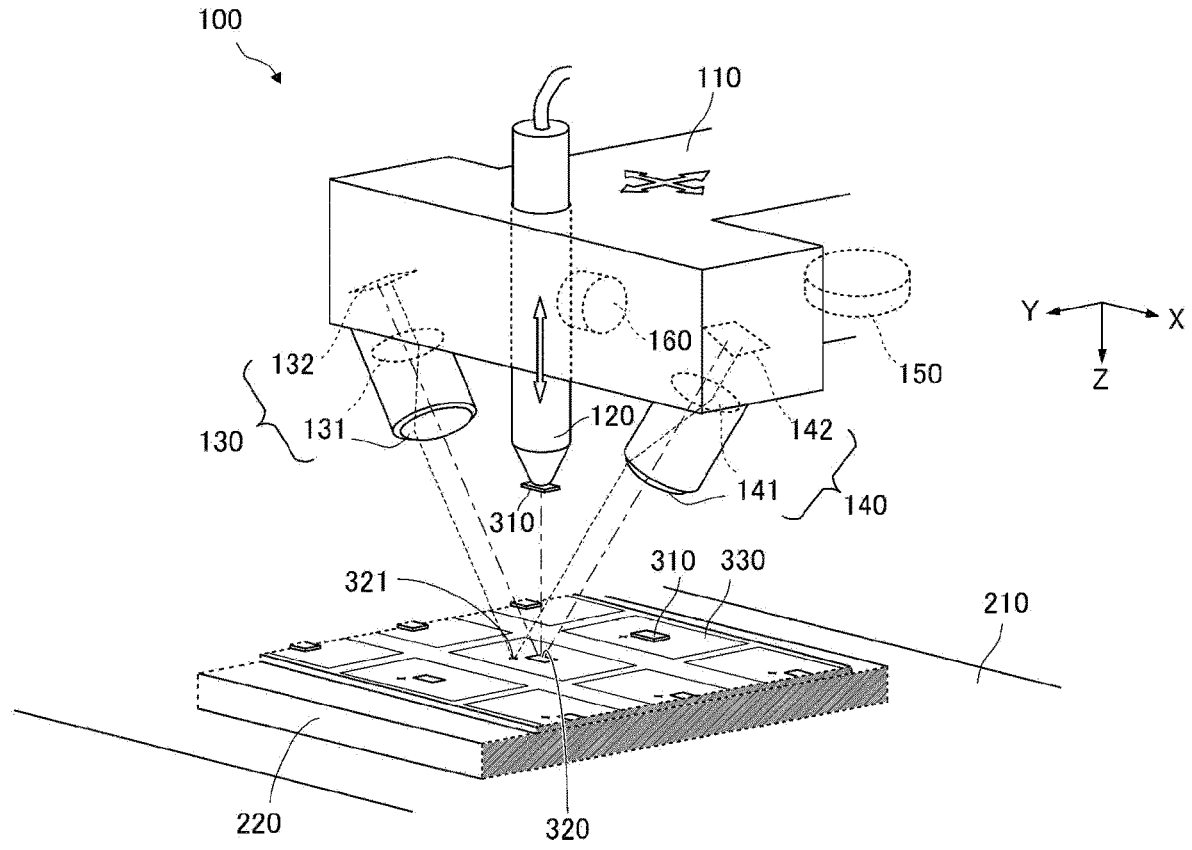
FIG. 1 is a perspective diagram schematically showing a main part of a die bonder according to the present embodiment.

FIG. 1 is a perspective diagram schematically showing a main part of a die bonder 100 according to this embodiment. The die bonder 100 is an example of a semiconductor manufacturing apparatus incorporating a position control apparatus, and is a bonding apparatus that places and adheres a semiconductor chip 310 to a die pad 320 of a lead frame 330. The lead frame 330 is an example of a substrate placed on a stage 220, and the die pad 320 is a placement region for placing the semiconductor chip 310 when the substrate is the lead frame 330.

The die bonder 100 mainly includes a head unit 110, a bonding tool 120, a first imaging unit 130 and a second imaging unit 140. The head unit 110 supports the bonding tool 120, the first imaging unit 130 and the second imaging unit 140, and is movable in the planar direction by a head drive motor 150. The planar direction is the horizontal direction defined by the X-axis direction and the Y-axis direction, and is also the moving direction of the stage 220 placed on a pedestal 210.

The bonding tool 120 sucks the semiconductor chip 310 at its tip, places it on the die pad 320 of the lead frame 330 placed on the stage 220, and pressurizes/heats it for adhering. The bonding tool 120 is movable in the height direction with respect to the head unit 110 by a tool drive motor 160. The height direction is the Z-axis direction perpendicular to the planar direction, as shown.

The first imaging unit 130 is an imaging unit for imaging the lead frame 330 positioned below the bonding tool 120 and includes a first optical system 131 and a first imaging element 132. Although specifically described later, but the first imaging unit 130 is obliquely provided on the head unit 110 with its optical axis directed downward from the bonding tool 120. The first optical system 131 and the first imaging element 132 are arranged to satisfy the Scheimpflug condition such that a plane parallel to the stage plane of the stage 220 becomes a focal plane.

The second imaging unit 140 is an imaging unit for imaging the lead frame 330 positioned below the bonding tool 120 and includes a second optical system 141 and a second imaging element 142. Although specifically described later, but the second imaging unit 140 is obliquely provided on the head unit 110 on the side opposite to the first imaging unit 130 with respect to the bonding tool 120 and with its optical axis directed downward from the bonding tool 120. The second optical system 141 and the second imaging element 142 are arranged to satisfy the Scheimpflug condition such that the plane parallel to the stage plane of the stage 220 becomes the focal plane.

The XYZ coordinate system is a spatial coordinate system with the reference position of the head unit 110 as the position. The die bonder 100 images an indicator 321 provided on the lead frame 330 by the first imaging unit 130 and the second imaging unit 140, and calculates three-dimensional coordinates $(X_R, Y_R, Z_R)$ of the indicator 321 from the images. The indicator 321 is a reference indicator as a reference mark. The reference indicator may be a reference mark provided for exclusive use, or a target such as a wiring pattern, a groove, an edge, etc. that may be observed on the work target, as long as the three-dimensional coordinates may be stably calculated.

The relative position of the die pad 320 with respect to the indicator 321 on a surface of the lead frame 330 is known. Therefore, the die bonder 100 may derive center coordinates $(X_T, Y_T, Z_T)$ of the die pad 320 from the three-dimensional coordinates $(X_R, Y_R, Z_R)$ of the indicator 321. In this embodiment, it is assumed that the die pad 320 and the indicator 321 are provided on the same plane of the lead frame 330, so $Z_R = Z_T$. The die bonder 100 drives the head unit 110 and the bonding tool 120 with the center coordinates $(X_T, Y_T, Z_T)$ of the die pad 320 as an approach target, and transports the semiconductor chip 310 to the coordinates.

Figure 2:
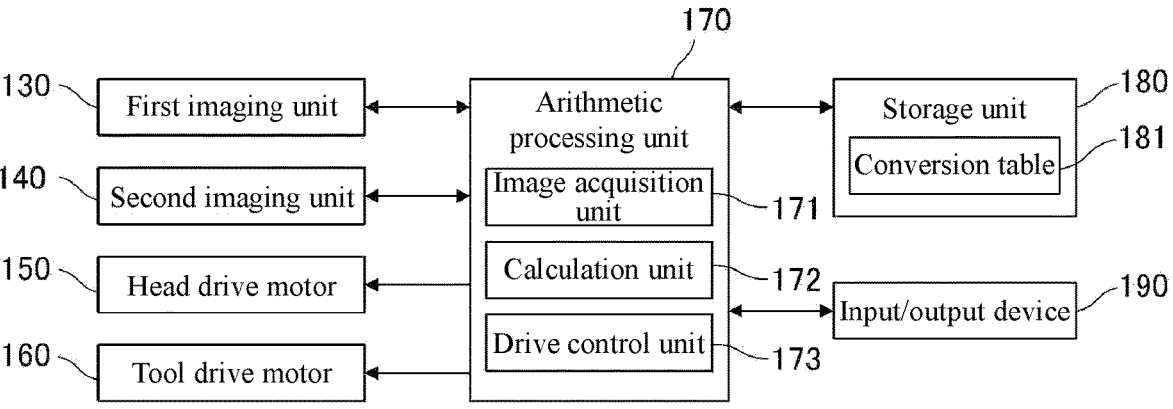
FIG. 2 is a system configuration diagram of a die bonder.

FIG. 2 is a system configuration diagram of the die bonder 100. A control system of the die bonder 100 is mainly composed of an arithmetic processing unit 170, a storage unit 180, an input/output device 190, the first imaging unit 130, the second imaging unit 140, the head drive motor 150, and the tool drive motor 160. The arithmetic processing unit 170 is a processor (CPU: Central Processing Unit) that controls the die bonder 100 and executes programs. The processor may be configured to cooperate with an arithmetic processing chip such as an ASIC (Application Specific Integrated Circuit) or a GPU (Graphics Processing Unit). The arithmetic processing unit 170 reads a position control program stored in the storage unit 180 and executes various processes related to position control.

The storage unit 180 is a nonvolatile storage medium, and is configured by, for example, an HDD (Hard Disk Drive). The storage unit 180 may store various parameter values, functions, look-up tables, etc. used for control and calculation, in addition to programs for executing control and processing of the die bonder 100. The storage unit 180 particularly stores a conversion table 181. The conversion table 181, although to be specifically described later, is a look-up table that, upon input of the coordinate values of a first indicator image and the coordinate values of a second indicator image, converts them into the three-dimensional coordinates $(X_R, Y_R, Z_R)$ of the indicator 321. Here, the first indicator image is an image of the indicator 321 captured in the first image output by the first imaging unit 130, and the second indicator image is an image of the indicator 321 captured in the second image output by the second imaging unit 140.

The input/output device 190 includes, for example, a keyboard, mouse, and display monitor, and is a device that accepts menu operations by the user and presents information to the user. For example, the arithmetic processing unit 170 may display the first image and the second image side by side on a display monitor, which is one of the input/output devices 190.

The first imaging unit 130 receives an imaging request signal from the arithmetic processing unit 170, executes imaging, and transmits the first image output by the first imaging element 132 to the arithmetic processing unit 170 as an image signal. Similarly, the second imaging unit 140 receives an imaging request signal from the arithmetic processing unit 170, executes imaging, and transmits the second image output by the second imaging element 142 to the arithmetic processing unit 170 as an image signal.

The head drive motor 150 receives a drive signal from the arithmetic processing unit 170 and moves the head unit 110 in the XY directions. The tool drive motor 160 receives a drive signal from the arithmetic processing unit 170 and moves the bonding tool 120 in the Z direction.

The arithmetic processing unit 170 also plays a role as a functional arithmetic unit that executes various arithmetic operations according to the processing instructed by the position control program. The arithmetic processing unit 170 may function as an image acquisition unit 171, a calculation unit 172, and a drive control unit 173. The image acquisition unit 171 transmits an imaging request signal to the first imaging unit 130 and the second imaging unit 140, and acquires the image signal of the first image and the image signal of the second image.

The calculation unit 172 calculates the three-dimensional coordinates $(X_R, Y_R, Z_R)$ of the indicator 321 based on the first indicator image which is an image of the indicator 321 captured in the first image, and the second indicator image which is an image of the indicator 321 captured in the second image. Specifically, the conversion table 181 is used to acquire the three-dimensional coordinates $(X_R, Y_R, Z_R)$. The drive control unit 173 generates a drive signal for driving the head drive motor 150 and a drive signal for driving the tool drive motor 160, and transmits them to the respective motors. For example, when the calculation unit 172 calculates the center coordinates $(X_T, Y_T, Z_T)$ of the die pad 320 from the three-dimensional coordinates $(X_R, Y_R, Z_R)$ of the indicator 321, a drive signal for bringing the bonding tool 120 closer to $(X_T, Y_T, Z_T)$ is generated and transmitted to the tool drive motor 160.

Figure 3:
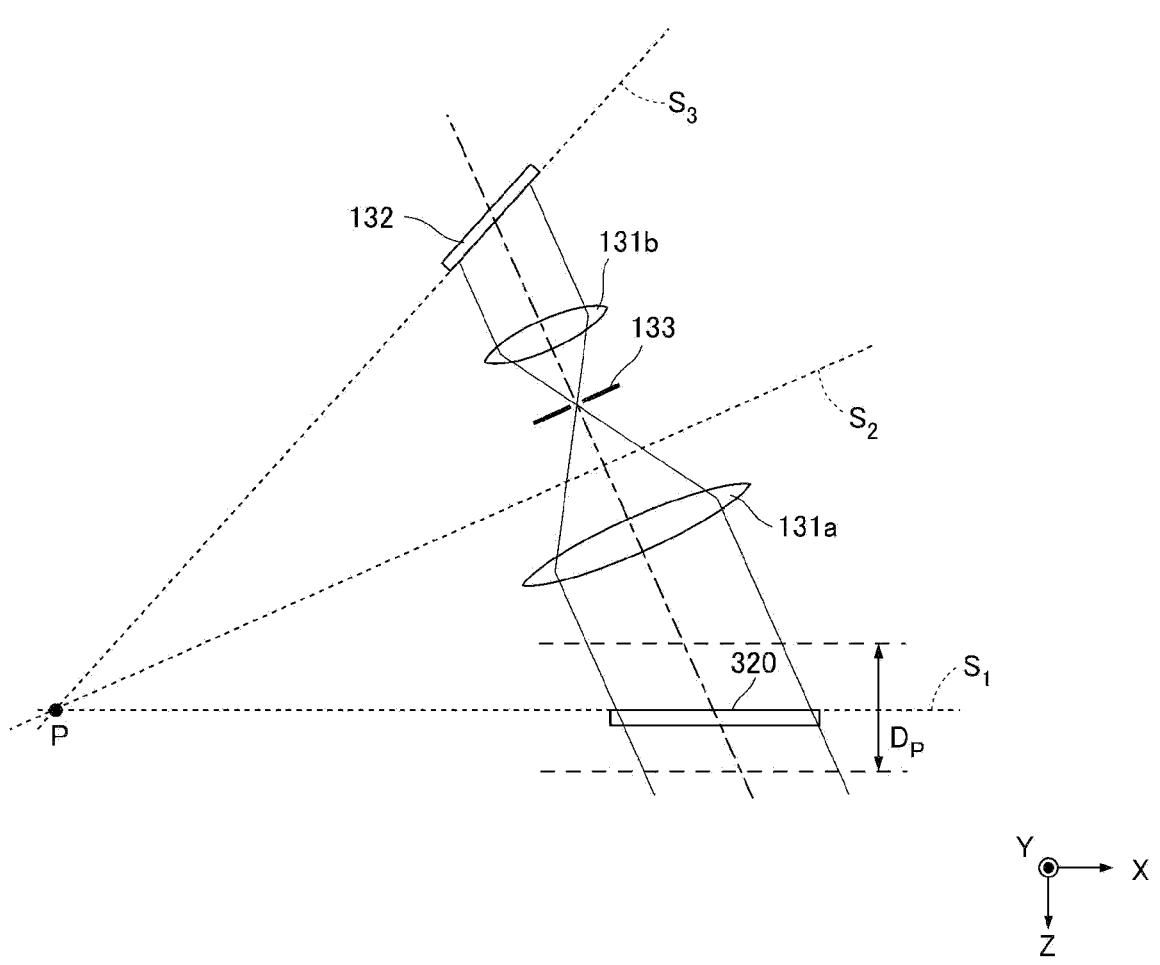
FIG. 3 is an explanatory diagram for explaining a Scheimpflug optical system.

FIG. 3 is an explanatory diagram for explaining the Scheimpflug optical system employed in the first imaging unit 130. A similar Scheimpflug optical system is employed in the second imaging unit 140, but here, the Scheimpflug optical system of the first imaging unit 130 will be described as a representative.

In FIG. 3, a plane $S_1$ is the intended focal plane of the die pad 320 arranged parallel to the stage plane of the stage 220. A virtual plane $S_2$ is a plane including a main plane of the first optical system 131 having an object-side lens group 131a and an image-side lens group 131b as a constituent group. A plane $S_3$ is a plane including a light receiving plane of the first imaging element 132. In this embodiment, the Scheimpflug optical system includes the first optical system 131 and the first imaging element 132 that are arranged to satisfy the Scheimpflug condition. An arrangement that satisfies the Scheimpflug condition is an arrangement in which the plane $S_1$, the virtual plane $S_2$, and the plane $S_3$ intersect each other on a common straight line P.

Although FIG. 3 shows the object-side lens group 131a and the die pad 320 close to each other for easy understanding of the Scheimpflug condition, they are actually separated from each other as shown in FIG. 1. The bonding tool 120 may move in the Z-axis direction without interfering with the first imaging unit 130 in a space above the die pad 320.

An aperture stop 133 is arranged between the object-side lens group 131a and the image-side lens group 131b, and limits light flux passing through. A depth of field $D_P$ may be adjusted by a diameter of the aperture stop 133. Therefore, when the tip of the bonding tool 120 holding the semiconductor chip 310 approaches within the depth of field $D_P$, for example, the first imaging unit 130 may image both the semiconductor chip 310 and the lead frame 330 plane in a focused state.

Since the first imaging unit 130 satisfies the Scheimpflug condition as described above, as long as the indicator 321 provided on the lead frame 330 is within the field of view of the first imaging unit 130, the indicator 321 may be imaged in a focused state. Moreover, both the indicator 321 and the die pad 320 may be imaged in one image in a focused state.

The second imaging unit 140 has the same configuration as the first imaging unit 130 and is arranged in the head unit 110 symmetrically with respect to the YZ plane including a central axis of the bonding tool 120. Therefore, the second imaging unit 140 is similar to the first imaging unit 130; as long as the indicator 321 provided on the lead frame 330 is within the field of view of the second imaging unit 140, the indicator 321 may also be imaged in a focused state. Moreover, both the indicator 321 and the die pad 320 may be imaged in one image in a focused state.

In this embodiment, both-side telecentricity is realized by the object-side lens group 131a and the image-side lens group 13 lb. This makes it possible to form an image of a target to be observed on the imaging element at a constant magnification, which is convenient for calculating three-dimensional coordinates. In particular, in the Scheimpflug optical system, it is desirable that both the target to be observed on the side of the straight line P and the target to be observed far from the straight line P are object-side telecentric such that the magnification is the same on the imaging plane.

Figure 4:
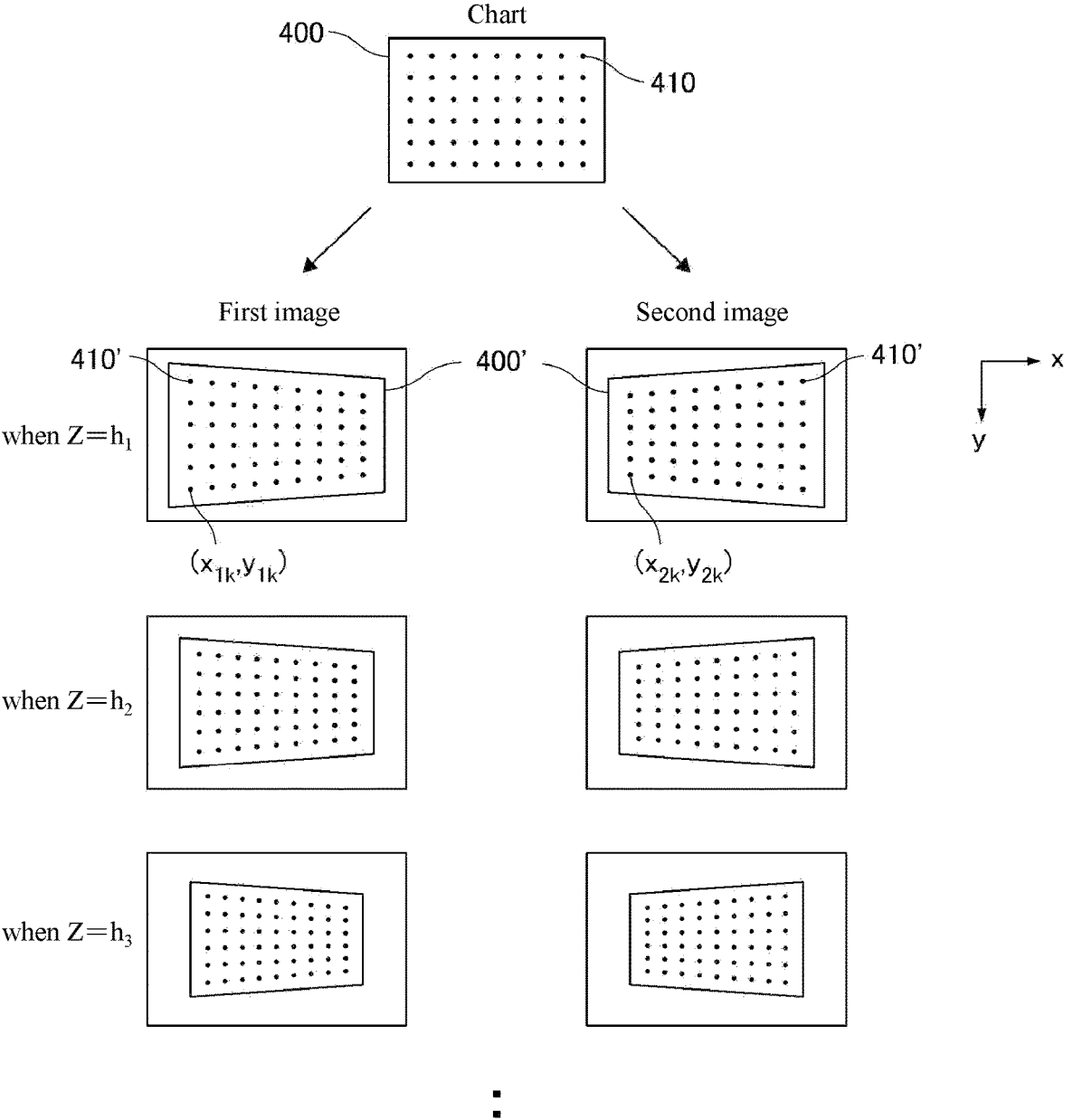
FIG. 4 is an explanatory diagram for explaining the calculation principle of three-dimensional coordinates.

FIG. 4 is an explanatory diagram for explaining the calculation principle of the three-dimensional coordinates $(X_R, Y_R, Z_R)$ of the indicator 321. In particular, it is a diagram for explaining the procedure for generating the conversion table 181. The conversion table 181 is generated using the first image of the first imaging unit 130 and the second image of the second imaging unit 140 obtained by placing a chart 400 having the same thickness as the lead frame 330 is placed on the stage 220 directly below the bonding tool 120 and imaging the chart 400.

A plurality of dots 410 are printed in a matrix on a surface of the chart 400 at set intervals. In such a chart 400, the height of the head unit 110 is adjusted to $Z=h_1, h_2, h_3 \ldots$, and imaging is executed at the respective heights to acquire a pair of the first image and the second image.

Since the first imaging unit 130 and the second imaging unit 140 employ a Scheimpflug optical system, resulting chart images 400' are in a fully focus state and are distorted into trapezoids in the opposite direction. If the horizontal axis is set as the x-axis and the vertical axis is set as the y-axis as the image coordinate system, coordinates $(x_{1k}, y_{1k})$, $(x_{2k}, y_{2k})$ of the dot images 410' corresponding to each other in the first image and the second image are calculated.

Coordinates $(X_k, Y_k)$ on the stage 220 for each dot 410 of the chart 400 are known, and since the height $h_k=Z_K$ is adjusted at the time of imaging, three-dimensional coordinates $(X_k, Y_k, Z_K)$ of each dot 410 are fixed at the time of imaging. Then, since the coordinates $(x_{1k}, y_{1k})$ and $(x_{2k}, y_{2k})$ of each dot image 410' of the first image and the second image imaged at the height $h_k$ are calculated, a correspondence relation between each dot 401 and the dot image 410' as the image thereof may be acquired. In other word, for each height at which imaging is executed, the correspondence relation between the three-dimensional coordinates $(X_k, Y_k, Z_K)$ and the two-dimensional coordinates $(x_{1k}, y_{1k})$, $(x_{2k}, y_{2k})$ may be discretely acquired. Such correspondence relation is described in the conversion table 181.

The conversion table 181 described and generated in this way is a collection of data indicating correspondence relation between the three-dimensional coordinates $(X_k, Y_k, Z_K)$ and the two-dimensional coordinates $(x_{1k}, y_{1k})$, $(x_{2k}, y_{2k})$, and may be used as a look-up table. In other words, by referring to the conversion table 181, coordinate values $(x_{1R}, y_{1R})$ of the first indicator image and coordinate values $(x_{2R}, y_{2R})$ of the second indicator image may be converted to the three-dimensional coordinates $(X_R, Y_R, Z_R)$ of the indicator 321. Moreover, in a case where calculated combination of $(x_{1R}, y_{1R})$ and $(x_{2R}, y_{2R})$ does not exist in the conversion table 181, interpolation processing may be performed using peripheral coordinates that exist in the conversion table 181.

Further, not limited to the conversion table 181 in look-up table format, other methods may also be used to covert the coordinate values $(x_{1R}, y_{1R})$ of the first indicator image and the coordinate values $(x_{2R}, y_{2R})$ of the second indicator image to the three-dimensional coordinates $(X_R, Y_R, Z_R)$ of the indicator 321. For example, a polynomial approximation function may be acquired according to the correspondence relation between the three-dimensional coordinates $(X_k, Y_k, Z_K)$ and the two-dimensional coordinates $(x_{1k}, y_{1k})$ and $(x_{2k}, y_{2k})$ acquired in advance using the chart 400, so as to convert $(x_{1R}, y_{1R})$ and $(x_{2R}, y_{2R})$ to $(X_R, Y_R, Z_R)$. In this way, in the case of using a look-up table or polynomial approximation function generated based on actual measurement data, since the actually measured data absorbs the error factors caused by the constituent elements such as lens aberration and attachment error of the imaging unit, it is expected that three-dimensional coordinates can be calculated with higher accuracy.

On the other hand, the conversion formula may be calculated arithmetically using Scheimpflug's geometric condition, a baseline length defined between two imaging elements, and the like, without depending on the measured data. For example, a transformation matrix for transforming a trapezoidal image into a rectangular image is predetermined using physical quantities such as the tilt angle of the optical system or an imaging element as a parameter, and trapezoidal correction is performed on the first image and the second image using this transformation matrix. Then, the two images subjected to trapezoidal correction are treated as stereo images, and the three-dimensional coordinates of the target to be observed are calculated from a positional deviation amount of the images. Such a method is advantageous in that it omits the need to acquire actual measurement data in advance using a chart or the like.

Figure 5:
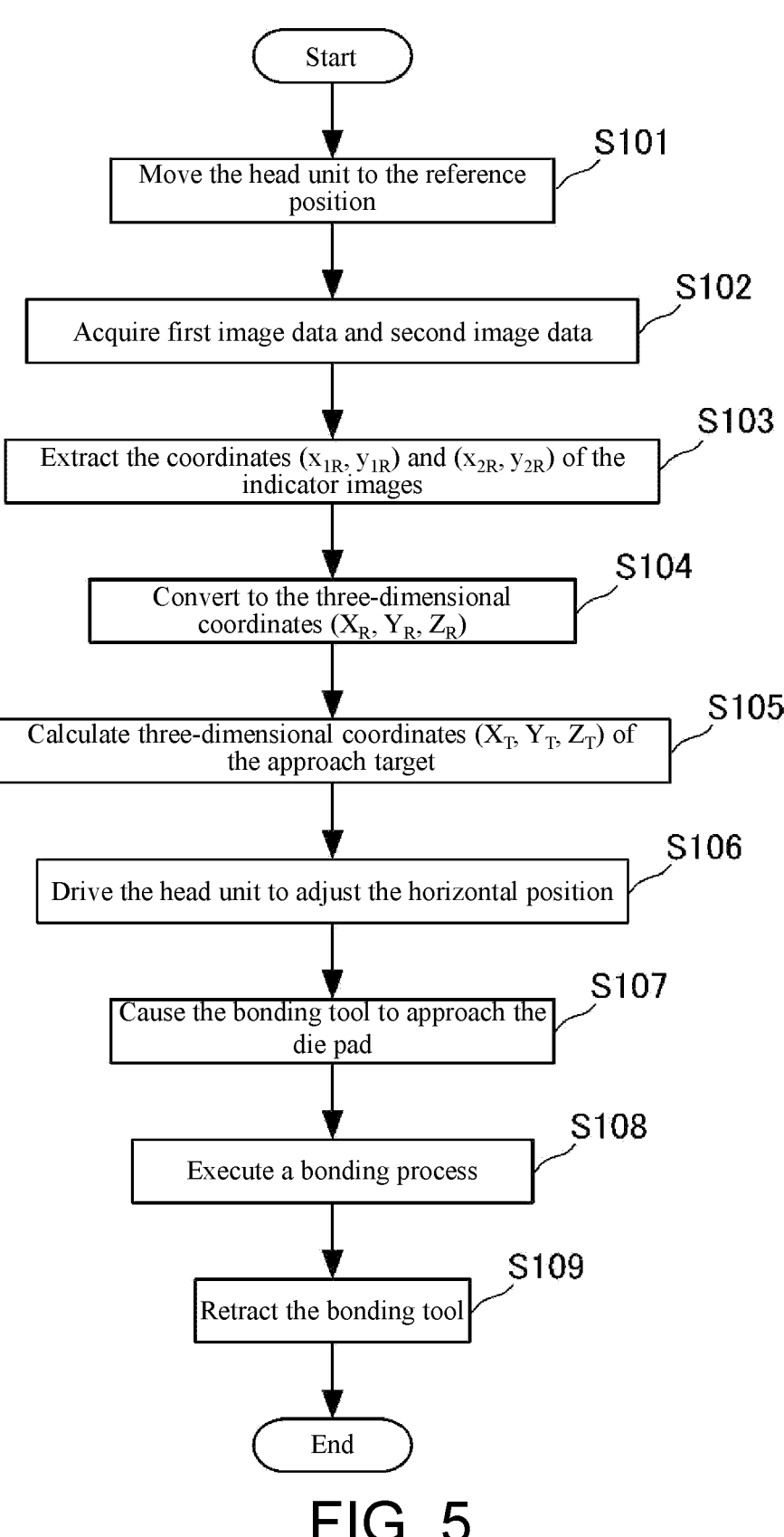
FIG. 5 is a flowchart for explaining a processing procedure of an arithmetic processing unit.

Next, a series of bonding processes by the die bonder 100 will be described. FIG. 5 is a flowchart for explaining the processing procedure of the arithmetic processing unit 170. Here, the processing from the state where the bonding tool 120 sucks the semiconductor chip 310 to the state where the semiconductor chip 310 is adhered to the die pad 320 and retracted will be described.

The drive control unit 173 transmits a drive signal for moving the head unit 110 to the reference position to the head drive motor 150 in step S101. The head drive motor 150 receives the drive signal and moves the head unit 110 to the reference position. Here, the reference position is an initial position assuming that the bonding tool 120 is positioned directly above the die pad 320 which is a target on which the semiconductor chip 310 is to be placed next.

When the head unit 110 reaches the reference position, the image acquisition unit 171 transmits an imaging request signal to the first imaging unit 130 and the second imaging unit 140 to acquire first image data and second image data in step S102. The image acquisition unit 171 delivers the acquired image data to the calculation unit.

In step S103, the calculation unit 172 extracts the coordinates $(x_{1R}, y_{1R})$ of the first indicator image from the first image of the first image data received from the image acquisition unit 171, and extracts the coordinates $(x_{2R}, y_{2R})$ of the second indicator image from the second image of the second image data. Then, the process proceeds to step S104, in which the calculation unit 172 refers to the conversion table 181 to acquire the three-dimensional coordinates $(X_R, Y_R, Z_R)$ corresponding to the pair of $(x_{1R}, y_{1R})$ and $(x_{2R}, y_{2R})$. Further, in step S105, using the information on the relative position of the die pad 320 with respect to the indicator 321, the center coordinates $(X_T, Y_T, Z_T)$ of the die pad 320, which is the approach target, are calculated.

When the approach target is determined, the drive control unit 173 transmits a drive signal to the head drive motor 150 to adjust the horizontal position error in step S106. Thereby, the center of the bonding tool 120 is arranged at $(X_T, Y_T)$ on a horizontal plane. Next, based on the calculated $Z=Z_T$, the drive control unit 173 causes the bonding tool 120 to approach the die pad 320 until the semiconductor chip 310 sucked by the bonding tool 120 is placed on the die pad 320 in step S107. Here, since an amount of descent of the bonding tool 120 is accurately grasped from the calculated $Z_T$, the drive control unit 173 may lower the bonding tool 120 at high speed until just before the semiconductor chip 310 contacts the die pad 320.

After placing the semiconductor chip 310 on the die pad 320, the arithmetic processing unit 170 executes a bonding process for adhering the semiconductor chip 310 to the die pad 320 in step S108. When the bonding process is completed, the drive control unit 173 raises the bonding tool 120, retracts from the adhered semiconductor chip 310, and ends the series of processes in step S109.

According to this embodiment described above, the head unit 110 is moved in such a way that the bonding tool 120 is positioned nearly directly above the die pad 320 which is a target on which the semiconductor chip 310 is to be placed, and the indicator 321 is imaged at that position. Since the indicator 321 is arranged near the die pad 320 which is the work target and the relative position of the die pad 320 with respect to the indicator 321 is known, as soon as the three-dimensional coordinates of the indicator 321 may be calculated, work may be executed on the die pad 320. In other words, unlike the prior art position confirmation and work need not be executed sequentially, thus measurement errors can be suppressed and the lead time from the three-dimensional coordinate measurement to the execution of work can be shortened.

Further, in a case where the reference indicator (the indicator 321) and the work target (the die pad 320) are separate as in this embodiment, it is preferable that they are within the same field of view in each imaging unit. In other words, it is preferable that the first image and the second image are arranged close to each other such that both of them are captured in each of the first image and the second image. At this closeness, the horizontal movement of the head unit 110 can be suppressed to a very small amount, thus the lead time can be further shortened. Moreover, although in this embodiment, the indicator 321 as a reference indicator is provided on the surface of the lead frame 330, as long as the work targets are close enough to each other to be within the same field of view, the reference indicator may be provided on the stage 220. Moreover, if the work target itself on which the tool unit works is provided with the reference indicator, the three-dimensional coordinates may be directly used as the work target, which is even more convenient.

Next, some modifications will be described. In the above embodiment, it is assumed that the lead frame 330 is correctly set on the stage 220. However, in practice, it may be installed in a state of being slightly rotated around the Z-axis. If such an installation error exists, even if the relative position of the die pad 320 with respect to the indicator 321 is known, the center coordinates $(X_T, Y_T, Z_T)$ of the die pad 320 cannot be calculated correctly from the three-dimensional coordinates $(X_R, Y_R, Z_R)$ of the indicator 321. Thus, two or more indicators are provided for one die pad 320 on the lead frame 330.

Figure 6:
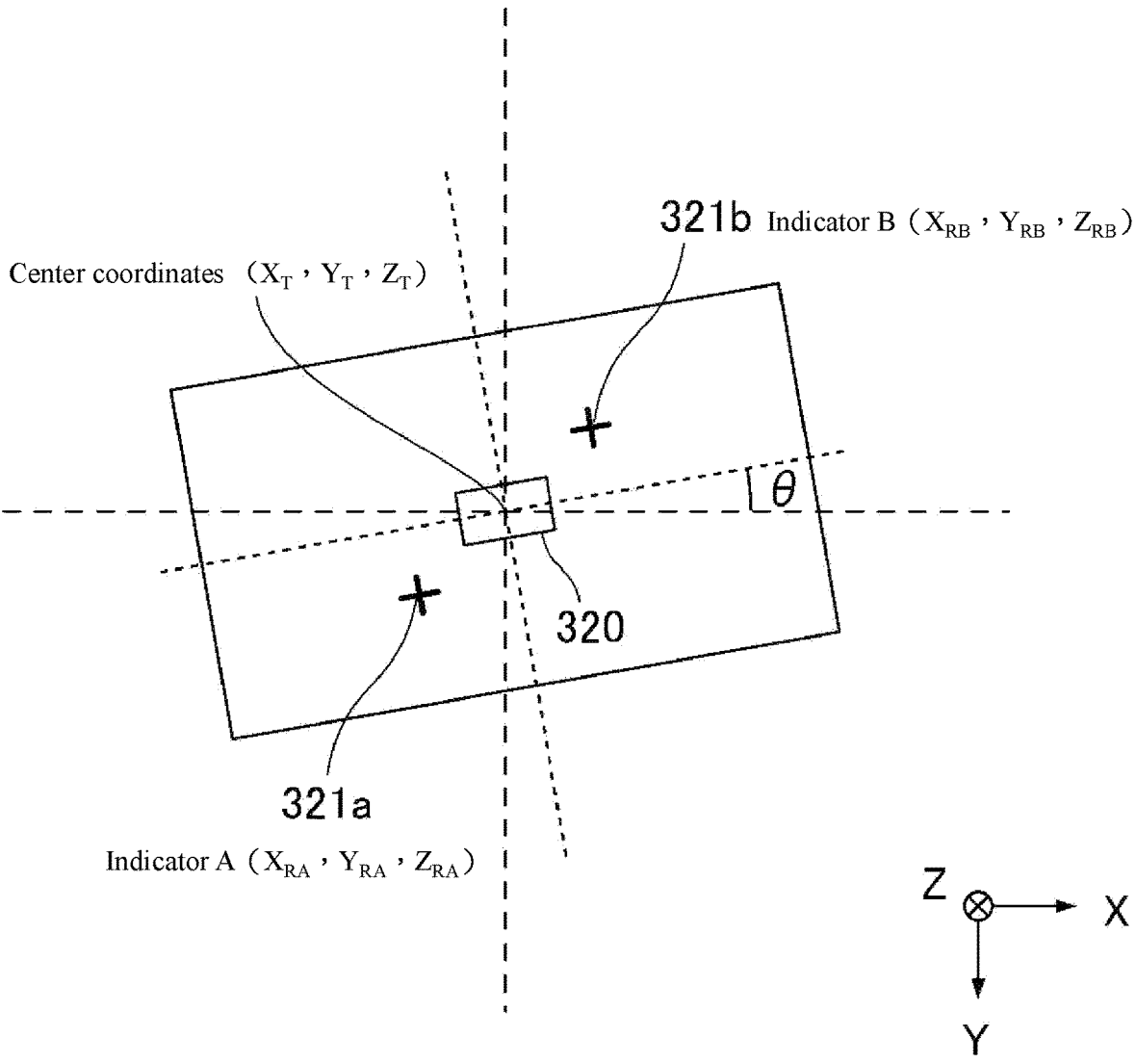
FIG. 6 is a diagram for explaining calculation of center coordinates when two indicators are provided for one die pad.

FIG. 6 is a diagram for explaining calculation of center coordinates when two indicators are provided for one die pad 320. As shown, for example, in a case where two indicators, an indicator A321a and an indicator B321b, are respectively provided diagonally on the lead frame 330 with the die pad 320 sandwiched therebetween, two indicator images, the indicator A321a and the indicator B321b, are captured in the first image, and similarly the two indicator images, the indicator A321a and the indicator B321b, are captured in the second image.

The calculation unit 172 calculates three-dimensional coordinates $(X_{RA}, Y_{RA}, Z_{RA})$ of the indicator A321a from the pair of the coordinates of the indicator image of the indicator A321a captured in the first image and the coordinates of the indicator image of the indicator A321a captured in the second image. Similarly, three-dimensional coordinates $(X_{RB}, Y_{RB}, Z_{RB})$ of the indicator B321b are calculated from the pair of the coordinates of the indicator image of the indicator B321b captured in the first image and the coordinates of the indicator image of the indicator B321b captured in the second image.

Since the relative coordinates of the indicator A321a and the indicator B321b are known, an amount of rotation θ around the Z axis may be grasped by calculating the two three-dimensional coordinates. The amount of rotation θ around the Z-axis is an installation error of the lead frame 330 with respect to the stage 220, thus the calculation unit 172 may calculate the center coordinates $(X_T, Y_T, Z_T)$ taking into account this installation error. In other words, the drive control unit 173 may bring the bonding tool 120 closer to the die pad 320.

Furthermore, a modified example will be further described. In the above embodiment, it is assumed that the bonding tool 120 is assembled with the head unit 110 without error. In practice, however, assembly errors may occur. If such an assembly error exists, even if the center coordinates $(X_T, Y_T, Z_T)$ of the die pad 320 can be calculated correctly, the semiconductor chip 310 will be arranged to be deviated from the assumed position. Thus, two confirmation indicators are provided at the tip of the bonding tool 120, imaging is executed when these confirmation indicators enter the depth of field of the first imaging unit 130 and the second imaging unit 140, and the assembly error of the bonding tool 120 is grasped on the basis on the image.

Figure 7:
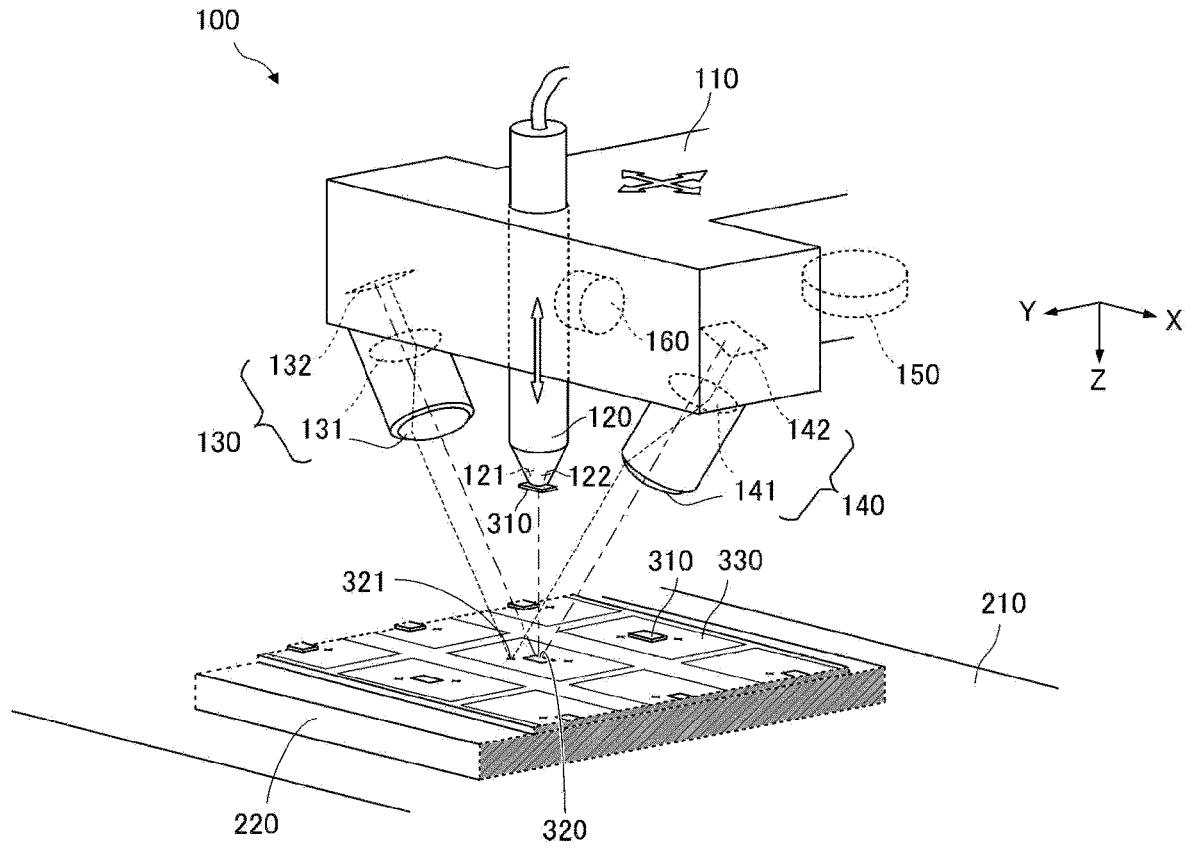
FIG. 7 is a perspective diagram showing a state in which a confirmation indicator is provided on a tip of a bonding tool.

FIG. 7 shows a first confirmation indicator 121 and a second confirmation indicator 122 provided at the tip of the bonding tool 120. The first confirmation indicator 121 is provided on a first imaging unit 130 side of a tip side surface of the bonding tool 120, and the second confirmation indicator 122 is similarly provided on a second imaging unit 140 side of the tip side surface. When the bonding tool 120 is lowered and the tip approaches the die pad 320, the first confirmation indicator 121 enters the field of view and the depth of field of the first imaging unit 130, and the second confirmation indicator 122 enters the field of view and the depth of field of the second imaging unit 140. At that point, the descend bonding tool 120 is suspended, and the imaging of the first confirmation indicator 121 by the first imaging unit 130 and the imaging of the second confirmation indicator 122 by the second imaging unit 140 are executed.

A calculation unit 112 extracts indicator image coordinates $(x_{1A}, y_{1A})$ of the first confirmation indicator 121 from the first image. Similarly, indicator image coordinates $(x_{2B}, y_{2B})$ of the second confirmation indicator 122 are extracted from the second image. However, since the indicator image of the second confirmation indicator 122 is not captured in the first image, its coordinates $(x_{1B}, y_{1B})$ cannot be extracted. Similarly, since the indicator image of the first confirmation indicator 121 is not captured in the second image, its coordinates $(x_{2A}, y_{2A})$ cannot be extracted.

Here, the relative positions of the first confirmation indicator 121 and the second confirmation indicator 122 at the tip of the bonding tool 120 are known. Therefore, a combination of $(X_A, Y_A, Z_A)$ and $(X_B, Y_B, Z_B)$ is search in such a way that the difference between the three-dimensional coordinates $(X_A, Y_A, Z_A)$ converted from the pair of $(x_{1A}, y_{1A})$ and the temporary $(x_{2A}, y_{2A})$ extracted for the indicator image of the first confirmation indicator 121 and the three-dimensional coordinates $(X_B, Y_B, Z_B)$ converted from the pair of $(x_{2B}, y_{2B})$ and the temporary $(x_{1B}, y_{1B})$ extracted for the indicator image of the second confirmation indicator 122 becomes a known relative position. If the three-dimensional coordinates satisfying the conditions are found, they are determined as the three-dimensional coordinates of the first confirmation indicator 121 and the second confirmation indicator 122.

If the three-dimensional coordinates of the first confirmation indicator 121 and the second confirmation indicator 122 are acquired in this way, the coordinates of the tip of the bonding tool 120 can also be accurately calculated. Therefore, even if the bonding tool 120 is assembled to the head unit 110 with some error, the error may be corrected and the semiconductor chip 310 can be accurately placed on the die pad 320.

Although the present embodiment has been described above using the die bonder 100 as an example, the position control apparatus to which the calculation method of the three-dimensional coordinates and configuration according to the present embodiment may be applied is not limited to the die bonder. For example, it may be applied to flip chip bonders and wire bonders. When applied to a wire bonder, a capillary or the like is used as a tool unit for working on a target object placed on a stage. Furthermore, it may also be applied to a dicer or the like that divides a wafer into small pieces of semiconductor chips. Moreover, the tool unit such as the bonding tool is not limited to approaching the target object, and may be separated from the target object. For example, in a case where work is performed to retract the tool unit such that it does not come into contact with a specific location after the tool unit has drilled through the surface of the target object, the drive control unit separates the tool unit from the target object.

What is claimed is:

1. A position control apparatus comprising:
a tool unit placing a die on a target object placed on a stage;
a first imaging unit imaging a reference indicator which is set on the stage or the target object and outputting a first image;
a second imaging unit imaging the reference indicator and outputting a second image;
a head unit supporting the tool unit, the first imaging unit, and the second imaging unit;
a calculation unit calculating three-dimensional coordinates of the reference indicator based on a first indicator image which is an image of the reference indicator captured in the first image, and a second indicator image which is an image of the reference indicator captured in the second image, wherein the calculation unit is configured to calculate placement coordinates for placing the die from the three-dimensional coordinates; and
a drive control unit causing the tool unit to approach or separate from the target object based on the placement coordinates,
wherein the three-dimensional coordinates denote a position of the reference indicator with a reference position of the head unit taken as an origin.

2. The position control apparatus according to claim 1, wherein the first imaging unit and the second imaging unit are arranged such that a respective optical system and a respective imaging element thereof satisfies a Scheimpflug condition in a way that a plane parallel to a stage plane of the stage becomes a focal plane.

3. The position control apparatus according to claim 2, wherein a respective object-side optical system of the first imaging unit and the second imaging unit is telecentric.

4. The position control apparatus according to claim 3, wherein the calculation unit converts a pair of coordinates of the first indicator image and coordinates of the second indicator image into the three-dimensional coordinates by referring to a conversion table prepared in advance.

5. The position control apparatus according to claim 3, wherein the calculation unit performs trapezoidal correction processing for converting a trapezoidal image into a rectangular image on the first image and the second image, and calculates the three-dimensional coordinates based on a positional deviation amount of the first indicator image and the second indicator image after the trapezoidal correction processing.

6. The position control apparatus according to claim 3, wherein the calculation unit calculates an installation error of the target object with respect to the stage based on two or more of the first indicator images captured in the first image and two or more of the second indicator images captured in the second image, and the drive control unit causes the tool unit to approach the target object in consideration of the installation error.

7. The position control apparatus according to claim 3, wherein
the tool unit is extended from the head unit toward the target object under control of the drive control unit,
when the tool unit is extended from the head unit, the calculation unit calculates an assembly error of tool unit with respect to the head unit based on a third indicator image which is an image of a first confirmation indicator provided in the tool unit and which is captured in a third image outputted by the first imaging unit, and a fourth indicator image which is an image of a second confirmation indicator provided in the tool unit and which is captured in a fourth image outputted by the second imaging unit, and
the drive control unit causes the tool unit to approach the target object in consideration of the assembly error.

8. The position control apparatus according to claim 2, wherein the calculation unit converts a pair of coordinates of the first indicator image and coordinates of the second indicator image into the three-dimensional coordinates by referring to a conversion table prepared in advance.

9. The position control apparatus according to claim 8, wherein the calculation unit calculates an installation error of the target object with respect to the stage based on two or more of the first indicator images captured in the first image and two or more of the second indicator images captured in the second image, and
the drive control unit causes the tool unit to approach the target object in consideration of the installation error.

10. The position control apparatus according to claim 8, wherein
the tool unit is extended from the head unit toward the target object under control of the drive control unit,
when the tool unit is extended from the head unit, the calculation unit calculates an assembly error of tool unit with respect to the head unit based on a third indicator image which is an image of a first confirmation indicator provided in the tool unit and which is captured in a third image outputted by the first imaging unit, and a fourth indicator image which is an image of a second confirmation indicator provided in the tool unit and which is captured in a fourth image outputted by the second imaging unit, and
the drive control unit causes the tool unit to approach the target object in consideration of the assembly error.

11. The position control apparatus according to claim 2, wherein the calculation unit performs trapezoidal correction processing for converting a trapezoidal image into a rectangular image on the first image and the second image, and calculates the three-dimensional coordinates based on a positional deviation amount of the first indicator image and the second indicator image after the trapezoidal correction processing.

12. The position control apparatus according to claim 11, wherein the calculation unit calculates an installation error of the target object with respect to the stage based on two or more of the first indicator images captured in the first image and two or more of the second indicator images captured in the second image, and
the drive control unit causes the tool unit to approach the target object in consideration of the installation error.

13. The position control apparatus according to claim 11, wherein
the tool unit is extended from the head unit toward the target object under control of the drive control unit,
when the tool unit is extended from the head unit, the calculation unit calculates an assembly error of tool unit with respect to the head unit based on a third indicator image which is an image of a first confirmation indicator provided in the tool unit and which is captured in a third image outputted by the first imaging unit, and a fourth indicator image which is an image of a second confirmation indicator provided in the tool unit and which is captured in a fourth image outputted by the second imaging unit, and
the drive control unit causes the tool unit to approach the target object in consideration of the assembly error.

14. The position control apparatus according to claim 2, wherein the calculation unit calculates an installation error of the target object with respect to the stage based on two or more of the first indicator images captured in the first image and two or more of the second indicator images captured in the second image, and the drive control unit causes the tool unit to approach the target object in consideration of the installation error.

15. The position control apparatus according to claim 2, wherein the tool unit is extended from the head unit toward the target object under control of the drive control unit, when the tool unit is extended from the head unit, the calculation unit calculates an assembly error of tool unit with respect to the head unit based on a third indicator image which is an image of a first confirmation indicator provided in the tool unit and which is captured in a third image outputted by the first imaging unit, and a fourth indicator image which is an image of a second confirmation indicator provided in the tool unit and which is captured in a fourth image outputted by the second imaging unit, and the drive control unit causes the tool unit to approach the target object in consideration of the assembly error.

16. The position control apparatus according to claim 1, wherein the calculation unit calculates an installation error of the target object with respect to the stage based on two or more of the first indicator images captured in the first image and two or more of the second indicator images captured in the second image, and the drive control unit causes the tool unit to approach the target object in consideration of the installation error.

17. The position control apparatus according to claim 1, wherein the tool unit is extended from the head unit toward the target object under control of the drive control unit, when the tool unit is extended from the head unit, the calculation unit calculates an assembly error of tool unit with respect to the head unit based on a third indicator image which is an image of a first confirmation indicator provided in the tool unit and which is captured in a third image outputted by the first imaging unit, and a fourth indicator image which is an image of a second confirmation indicator provided in the tool unit and which is captured in a fourth image outputted by the second imaging unit, and the drive control unit causes the tool unit to approach the target object in consideration of the assembly error.

18. A position control method comprising:

an imaging step of causing each of a first imaging unit and a second imaging unit supported by a head unit to image a reference indicator set on a stage or a target object placed on the stage;

a calculation step of calculating three-dimensional coordinates of the reference indicator based on a first indicator image which is an image of the reference indicator captured in a first image outputted by the first imaging unit, and a second indicator image which is an image of the reference indicator captured in a second image outputted by the second imaging unit;

a calculation step of calculating placement coordinates for placing a die from the three-dimensional coordinates; and a driving step of causing a tool unit supported by the head unit and placing the die on the target object to approach or separate from the target object based on the placement coordinates, wherein the three-dimensional coordinates denote a position of the reference indicator with a reference position of the head unit taken as an origin.

19. A position control non-transitory recording medium that stores a program and causes a computer to execute:

an imaging step of causing each of a first imaging unit and a second imaging unit supported by a head unit to image a reference indicator set on a stage or a target object placed on the stage;

a calculation step of calculating three-dimensional coordinates of the reference indicator based on a first indicator image which is an image of the reference indicator captured in a first image outputted by the first imaging unit, and a second indicator image which is an image of the reference indicator captured in a second image outputted by the second imaging unit;

a calculation step of calculating placement coordinates for placing a die from the three-dimensional coordinates; and a driving step of causing a tool unit supported by the head unit and placing the die on the target object to approach or separate from the target object based on the placement coordinates, wherein the three-dimensional coordinates denote a position of the reference indicator with a reference position of the head unit taken as an origin.

20. A bonding apparatus comprising:

a bonding tool placing and bonding a semiconductor chip to a mounting region of a substrate placed on a stage;

a first imaging unit imaging a reference indicator which is set on the stage or the substrate and outputting a first image;

a second imaging unit imaging the reference indicator and outputting a second image;

a head unit supporting the bonding tool, the first imaging unit, and the second imaging unit;

a calculation unit calculating three-dimensional coordinates of the reference indicator based on a first indicator image which is an image of the reference indicator captured in the first image, and a second indicator image which is an image of the reference indicator captured in the second image, wherein the calculation unit is configured to calculate placement coordinates for placing the semiconductor chip from the three-dimensional coordinates; and a drive control unit causing the bonding tool holding the semiconductor chip to approach or separate from the mounting region based on the placement coordinates, wherein the three-dimensional coordinates denote a position of the reference indicator with a reference position of the head unit taken as an origin.

* * * * *